US006738106B1

(12) United States Patent
Tanahara et al.

(10) Patent No.: US 6,738,106 B1
(45) Date of Patent: May 18, 2004

(54) LIQUID CRYSTAL DISPLAY DEVICE

(75) Inventors: Manabu Tanahara, Kumamoto (JP);
Naoki Nakagawa, Tokyo (JP)

(73) Assignees: Advanced Display Inc., Kikuchi-gun (JP); Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/717,040

(22) Filed: Nov. 22, 2000

(30) Foreign Application Priority Data

Nov. 25, 1999 (JP) .......................................... 11-334628

(51) Int. Cl.$^7$ .............................................. G02F 1/136
(52) U.S. Cl. ............................................ 349/38; 349/39
(58) Field of Search .............................. 349/38, 92, 83, 349/39, 43, 42; 345/92

(56) References Cited

U.S. PATENT DOCUMENTS 6,028,650 A * 2/2000 Kuroha et al. ................. 349/38

* cited by examiner

Primary Examiner—James Dudek
Assistant Examiner—Thoi V. Duong
(74) Attorney, Agent, or Firm—Oblon, Spivak, McClelland, Maier & Neustadt, P.C.

(57) ABSTRACT

The present invention is directed to a liquid crystal display device including: a thin film transistor (TFT) substrate having a plurality of displaying pixels each with a pixel electrode connected to respective TFT; a plurality of gate lines for scanning said TFTs in line-wise manner; a plurality of source lines for applying signal potential of writing picture to the pixels, arranged almost perpendicular with said gate lines in a matrix manner; an opposing substrate interposing a liquid crystal material together with the TFT array substrate therebetween; and a plurality of auxiliary capacitance electrode; wherein each of said pixel electrodes forms an auxiliary capacitance by overlapping with respective auxiliary capacitance electrode, said overlapping is decreased in a direction from a signal input side to a signal transmission end of each gate line to form a difference of auxiliary capacitance value depending on a plurality of vertical band regions, and boundaries of said vertical band regions are formed in a zigzag manner.

6 Claims, 9 Drawing Sheets

LIQUID CRYSTAL DISPLAY DEVICE

BACKGROUND OF THE INVENTION

The present invention relates to an active matrix panel used in active matrix liquid crystal display devices and others, and a method for producing the same.

Liquid crystal panels include those of simple matrix type and those of active matrix type using a TFT (thin film transistor) as a switching element (TFT-LCD). In view of portability and display quality, the TFT-LCDs having more excellent characteristics than CRTs or liquid crystal display devices of simple matrix type are widely put into practical use in notebook-type personal computers and others.

In these TFT-LCDs, there is a problem that a flicker is generated owing to the distribution of field-through voltage in a display surface caused by parasitic capacitance of the TFT that they have.

Next, the field-through voltage will be described. Generally in an active matrix liquid crystal display using a TFT, the electric potential of pixel capacitance changes at the time when a gate writing signal falls due to the effect of parasitic capacitance between a gate and a drain of the TFT. This change is referred to as a field-through voltage. The field-through voltage $V_{FD}$ is represented as the following equation (1) using the capacitance Cgd between the gate and the drain of the TFT, a liquid crystal capacitance Clc, an auxiliary capacitance Cs, and a gate pulse amplitude $\Delta V_G$.

$$V_{FD}=C_{gd}\cdot \Delta V_G/(Clc+Cs+Cgd) \quad (1)$$

Next, the distribution of the field-through in the display surface will be described. The equation (1) holds in a case where the gate signal is an ideal pulse. However, in actual TFT-LCDs, the gate writing signal (scanning line selection pulse) input as a rectangular wave becomes loose accordance as the distance from the input terminal increases, owing to the time constant of a gate wiring. This looseness generates a time difference ($\Delta t$) between the time when the gate signal begins to fall and the time when the transistor is completely turned off, whereby the voltage of the pixel capacitance changing in the negative direction is pulled back in the positive direction by the field-through. Therefore, a difference in the field-through voltage is generated between the input side having a small looseness of the gate pulse and the end terminal side having a large looseness.

Taking the effect of this gate pulse looseness into account, the field-through voltage $V_{FD}$ is represented as the equation (2).

$$V_{FD2}=(Cgd\cdot\Delta V_G+\int I_{DS}\Delta t)/(Clc+Cs+Cgd) \quad (2)$$

$\Delta t$: gate delay time due to looseness $I_{DS}$: average value of the electric current flowing until the TFT is turned off Since $\Delta t$ is proportional to the wiring time constant (wiring resistance X wiring capacitance), $\Delta t$ is negligibly small on the gate pulse input side, so that $\int I_{DS}\Delta t \approx 0$. Therefore, the field-through voltage difference between the gate pulse input side and the end terminal side is represented by the following equation (3) as the difference between the equation (1) and the equation (2).

$$\Delta V_{FD}=\int I_{DS}\Delta t/(Clc+Cs+Cgd) \quad (3)$$

If there is a difference in the field-through voltage, a difference is generated in the voltage applied to the liquid crystal between the right side and the left side of the screen, thereby causing a brightness non-uniformity. Also, a positive negative non-symmetry is generated in the alternating current display voltage, thereby causing flickers.

As described above, the field-through voltage difference in the display screen due to the looseness of the gate signal waveform is proportional to the gate wiring time constant, thereby raising a larger problem as the LCD becomes larger in scale.

In order to deal with this problem, as a method for reducing the distribution of the field-through voltage in the display screen, Japanese Unexamined Patent Publication No. 05-232509 (1993) discloses a method of compensating for the field-through voltage change due to the parasitic capacitance by allowing the auxiliary capacitance of the transistor element in the display surface to be large on the gate signal input terminal and to become smaller as it approaches the gate end terminal in the gate wiring direction.

Generally, the photomask used for forming a TFT array has a coarse resolution (about 0.5 $\mu$m pitch) as compared with those used for semiconductors. Therefore, if an overlapping area of the pixel electrode and the auxiliary capacitance electrode is changed, for example, in order to change the auxiliary capacitance over a range from the gate input terminal to the end terminal, it is difficult to provide a fine capacitance variation. Therefore, the change in the capacitance value is allowed to be a stepwise change as shown in FIG. 11, for example, by dividing the range into regions A, B, and C as shown in FIG. 10. At this time, the field-through voltage in each region is distributed as shown in FIG. 12. As a result, at a boundary AB where the region A including pixels a is in contact with the region B including pixels b having a different auxiliary capacitance value, for example, the change in the effective voltage difference is generated owing to the field-through voltage difference A $V_{FD2}$, and this change may possibly degrade the display quality as a brightness non-uniformity.

Further, if a fine capacitance change can be provided, for example, by raising the mask precision, pixels having different auxiliary capacitances must be created as CAD data for the maximum number of source wirings (for example, 3840 in SXGA), to be disposed in the panel. The increase in the data volume and the increase in the cumbersomeness of the layout work occurring at this time degrade the CAD layout workability and, in the worst case, the CAD data volume may overflow to shut down the system or cause a mask layout mistake.

The present invention has been made to solve the aforementioned problems of the prior art technique, and an object thereof is to eliminate the brightness non-uniformity on the regional boundary line when the auxiliary capacitance value is varied in order to reduce the brightness non-uniformity and the flickers caused by the field-through voltage difference value.

SUMMARY OF THE INVENTION

A liquid crystal display device according to the first aspect of the present invention is a liquid crystal display device having a construction such that a liquid crystal is sandwiched between a TFT array substrate and an opposing substrate, in which display pixels having a pixel electrode electrically connected to a thin film transistor are formed in an array on the insulating substrate, a gate line that scans and selects each transistor line-sequentially and a source line that gives a signal potential for writing to the pixel electrode are formed in a matrix in an almost perpendicular manner, and an auxiliary capacitance is formed by forming the pixel electrode and an auxiliary capacitance electrode to partially overlap with each other, wherein pixels having varying auxiliary capacitance values by decreasing an overlapping part of the pixel electrode and the auxiliary capacitance electrode in a direction from a gate signal input terminal to an end terminal are disposed to be divided into a plurality of band-shaped regions, and regional boundaries thereof are unevenly shaped.

A liquid crystal display device according to the second aspect of the present invention is a liquid crystal display device having a construction such that a liquid crystal is sandwiched between a TFT array substrate and an opposing substrate, in which display pixels having a pixel electrode electrically connected to a thin film transistor are formed in an array on an insulating substrate, a gate line that scans and selects each transistor line-sequentially and a source line that gives a signal potential for writing to the pixel electrode are formed in a matrix in an almost perpendicular state, and an auxiliary capacitance is formed by forming the pixel electrode and the gate line to partially overlap with each other, wherein pixels having varying auxiliary capacitance values by decreasing an overlapping part of the pixel electrode and the gate line in a direction from a gate signal input terminal to an end terminal are disposed to be divided into a plurality of band-shaped regions, and regional boundaries thereof are unevenly shaped.

A liquid crystal display device according to the third aspect of the present invention is a liquid crystal display device having a construction such that a liquid crystal is sandwiched between a TFT array substrate and an opposing substrate, in which display pixels having a pixel electrode electrically connected to a thin film transistor are formed in an array on an insulating substrate, a gate line that scans and selects each transistor line-sequentially and a source line that gives a signal potential for writing to the pixel electrode are formed in a matrix in an almost perpendicular state, and an auxiliary capacitance is formed by forming the pixel electrode and an auxiliary capacitance electrode to partially overlap with each other, wherein pixels having varying auxiliary capacitance values by decreasing an overlapping part of the pixel electrode and the auxiliary capacitance electrode in a direction from a gate signal input terminal to an end terminal are disposed to be divided into a plurality of band-shaped regions, a region where the pixels having varying auxiliary capacitance values are mixedly present is formed at a boundary part of the band-shaped regions where the pixels having varying auxiliary capacitance values are disposed, and the pixels having varying auxiliary capacitance values are randomly disposed in the boundary region.

A liquid crystal display device according to the fourth aspect of the present invention is a liquid crystal display device having a construction such that a liquid crystal is sandwiched between a TFT array substrate and an opposing substrate, in which display pixels having a pixel electrode electrically connected to a thin film transistor are formed in an array on an insulating substrate, a gate line that scans and selects each transistor line-sequentially and a source line that gives a signal potential for writing to the pixel electrode are formed in a matrix in an almost perpendicular state, and an auxiliary capacitance is formed by forming the pixel electrode and an auxiliary capacitance electrode to partially overlap with each other, wherein pixels having varying auxiliary capacitance values by decreasing an overlapping part of the pixel electrode and the auxiliary capacitance electrode in a direction from a gate signal input terminal to an end terminal are disposed to be divided into a plurality of band-shaped regions, a region where the pixels having varying auxiliary capacitance values are mixedly present is formed at a boundary part of the band-shaped regions where the pixels having varying auxiliary capacitance values are disposed, and a ratio of the pixels having varying auxiliary capacitance values is continuously changed along a source address in the boundary region.

A liquid crystal display device according to the fifth aspect of the present invention is a liquid crystal display device having a construction such that a liquid crystal is sandwiched between a TFT array substrate and an opposing substrate, in which display pixels having a pixel electrode electrically connected to a thin film transistor are formed in an array on an insulating substrate, a gate line that scans and selects each transistor line-sequentially and a source line that gives a signal potential for writing to the pixel electrode are formed in a matrix in an almost perpendicular state, and an auxiliary capacitance is formed by forming the pixel electrode and the gate line to partially overlap with each other, wherein pixels having varying auxiliary capacitance values by decreasing an overlapping part of the pixel electrode and the gate line in a direction from a gate signal input terminal to an end terminal are disposed to be divided into a plurality of band-shaped regions, a region where the pixels having varying auxiliary capacitance values are mixedly present is formed at a boundary part of the band-shaped regions where the pixels having varying auxiliary capacitance values are disposed, and the pixels having varying auxiliary capacitance values are randomly disposed in the boundary region.

A liquid crystal display device according to the sixth aspect of the present invention is a liquid crystal display device having a construction such that a liquid crystal is sandwiched between a TFT array substrate and an opposing substrate, in which display pixels having a pixel electrode electrically connected to a thin film transistor are formed in an array on an insulating substrate, a gate line that scans and selects each transistor line-sequentially and a source line that gives a signal potential for writing to the pixel electrode are formed in a matrix in an almost perpendicular state, and an auxiliary capacitance is formed by forming the pixel electrode and the gate line to partially overlap with each other, wherein pixels having varying auxiliary capacitance values by decreasing an overlapping part of the pixel electrode and the gate line in a direction from a gate signal input terminal to an end terminal are disposed to be divided into a plurality of band-shaped regions, a region where the pixels having varying auxiliary capacitance values are mixedly present is formed at a boundary part of the band-shaped regions where the pixels having varying auxiliary capacitance values are disposed, and a ratio of the pixels having varying auxiliary capacitance values is continuously changed along a source address in the boundary region.

DETAILED DESCRIPTION

Figure 1:
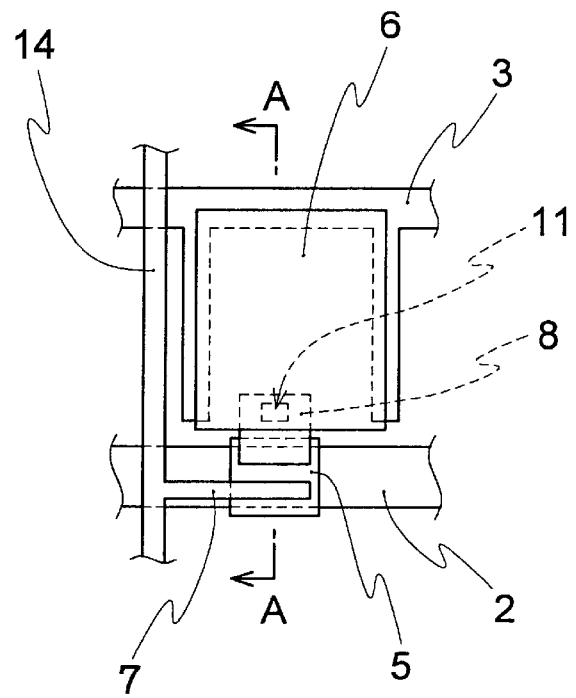
FIG. 1 is a plan view showing an example of displaying pixels of one embodiment of the present invention.
Figure 2:
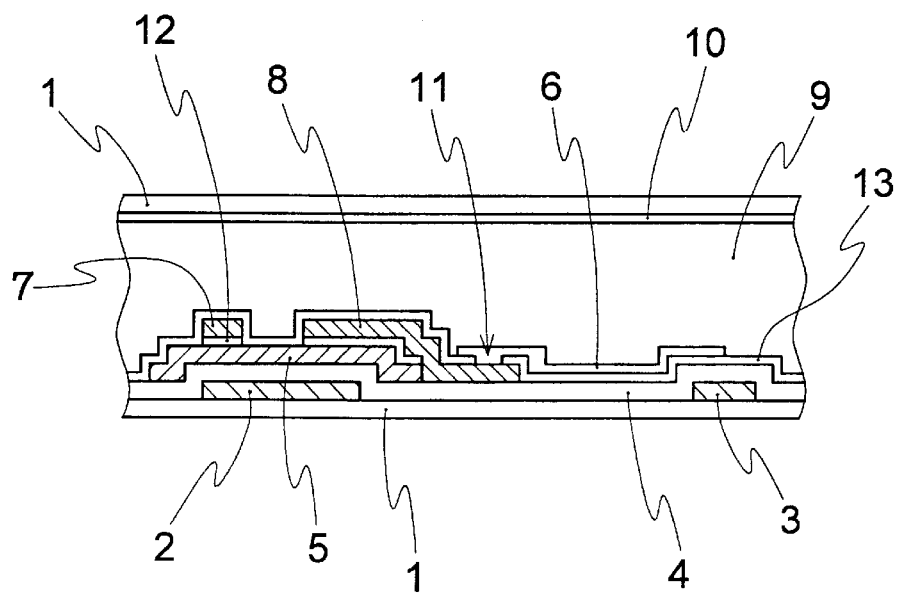
FIG. 2 is a cross sectional view of an example of displaying pixels of liquid crystal panel of one embodiment of the present invention.

Hereafter, the preferred embodiments of the present invention will be described with reference to the attached drawings. FIG. 1 is a plan view of a display pixel of a liquid crystal panel according to a preferred embodiment of the present invention, and FIG. 2 is a cross section view cut along the line A—A of FIG. 1.

Figure 10:
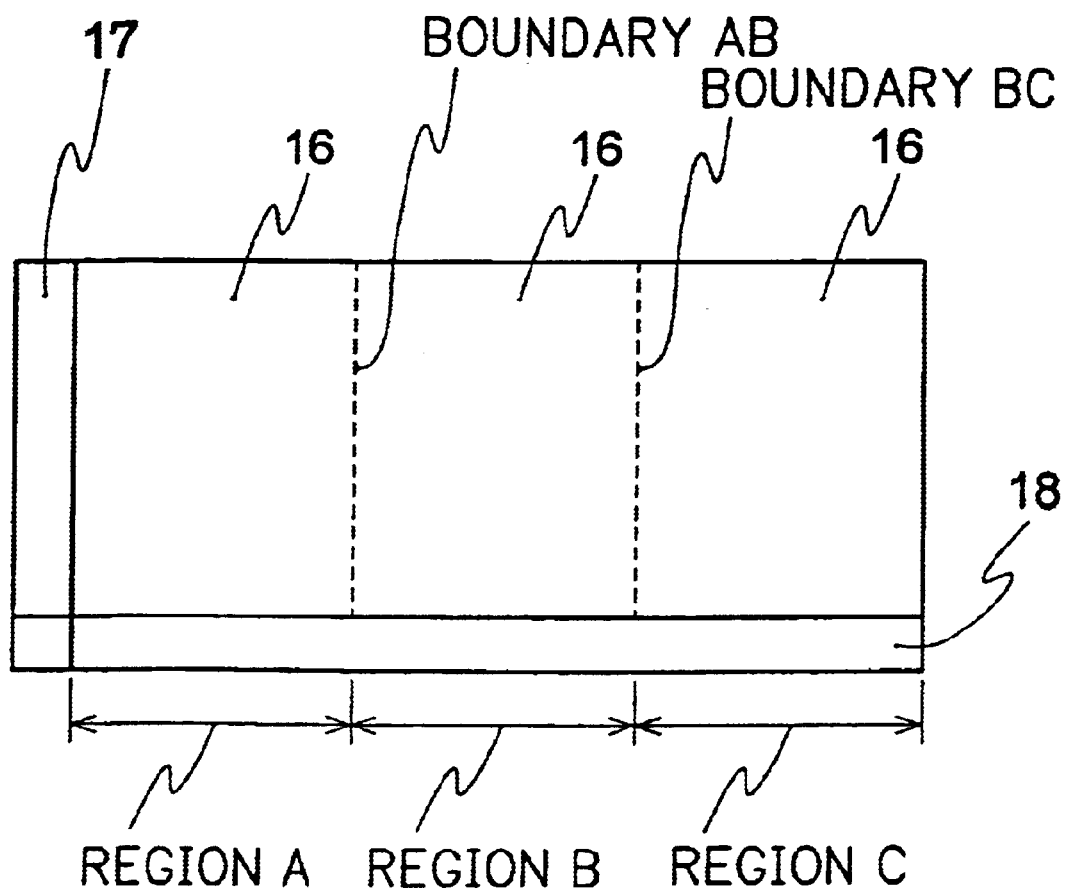
FIG. 10 is a plan view showing a conventional TFT array substrate of liquid crystal display device.
Figure 11:
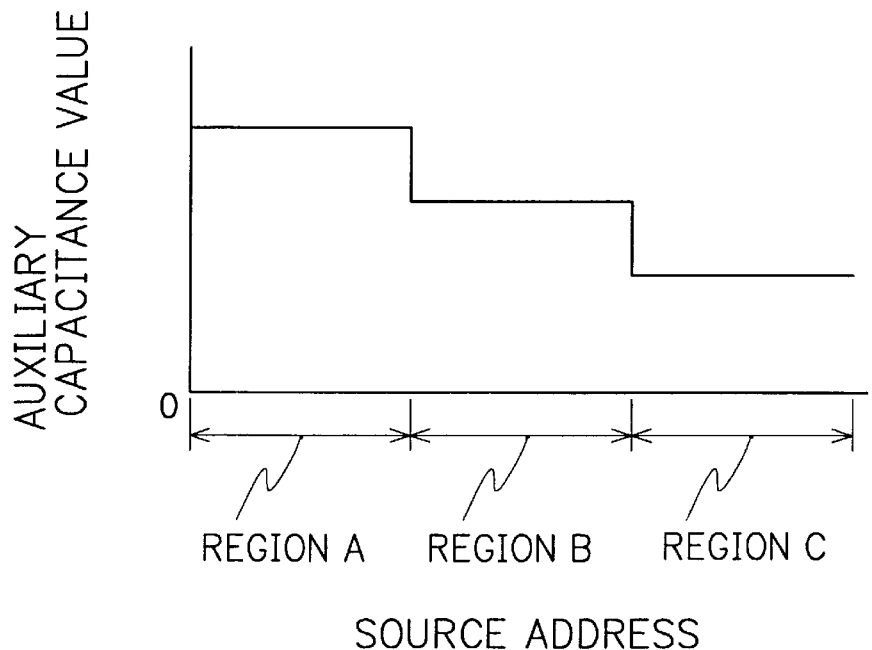
FIG. 11 is a graph showing a distribution of auxiliary capacitance in the conventional liquid crystal display device.
Figure 12:
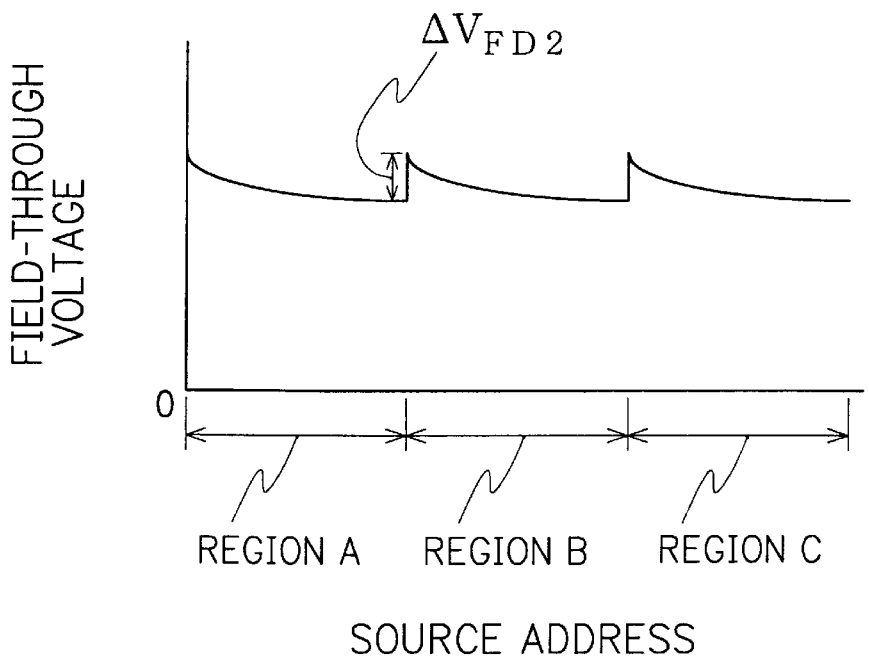
FIG. 12 is a graph showing a distribution of field-through voltage in the conventional liquid crystal display device.
Figure 13A:
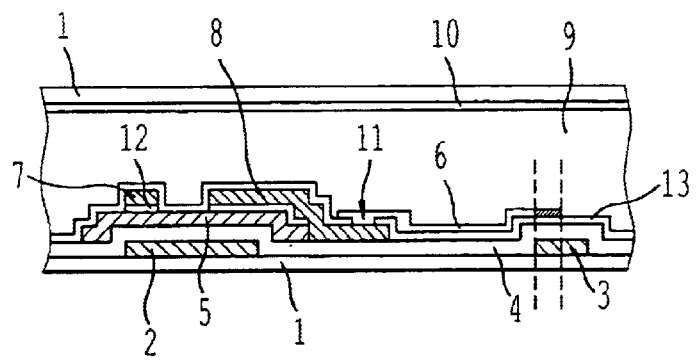
FIG. 13a is a graph showing an auxiliary capacitance formed by pixel electrodes overlapped with auxiliary capacitance electrodes and corresponds to region A of FIG. 10.
Figure 13B:
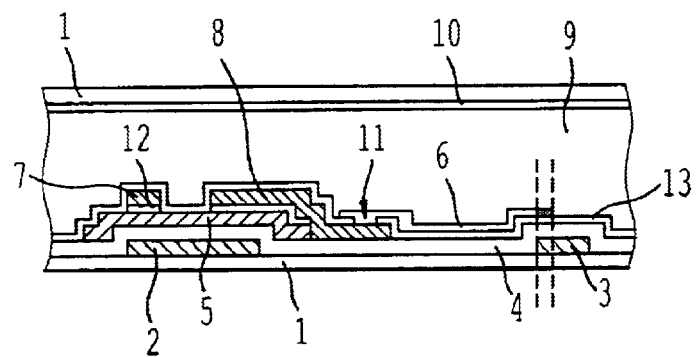
FIG. 13b is a graph showing a decreased auxiliary capacitance corresponding to region B of FIG. 10.
Figure 13C:
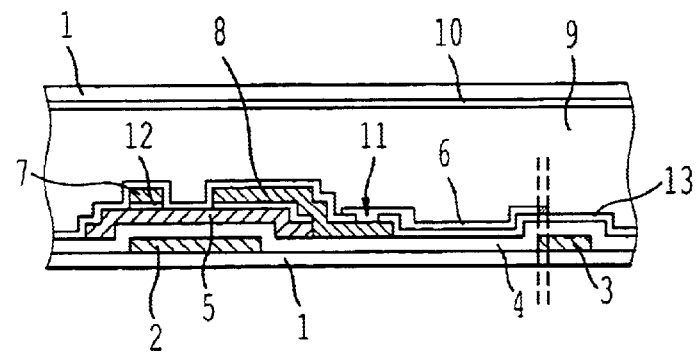
FIG. 13c is a graph showing the auxiliary capacitance corresponding to region C of FIG. 10 and the auxiliary capacitance is further decreased relative to the auxiliary capacitance corresponding to pixels a and b.

First, a first metal thin film is formed on a glass substrate by sputtering or the like, and then a gate signal line, a gate electrode 2, and an auxiliary capacitance electrode part 3 are formed in a desired pattern. Next, an insulating film 4, a semiconductor active film 5, and an ohmic contact film 12 are successively formed by plasma CVD, and the semiconductor active film 5 and the ohmic contact film 12 are formed in a desired pattern. Subsequently, a second metal thin film is formed by sputtering or the like and, after a source electrode 7, a drain electrode 8, and a source line 14 are formed in a desired pattern, a protective film 13 is formed, and a pixel electrode 6 is formed thereon. At this time, the pixel electrode 6 is connected to the drain electrode 8 via a contact hole 11. The pixel electrode 6 is allowed to partially overlap with the auxiliary capacitance electrode 3 to form an auxiliary capacitance. The overlapping amount is allowed to decrease as shown in FIG. 11 in the direction from the region A to the region C as shown in FIG. 10 (as it approaches from the gate signal input terminal to the end terminal). In addition, FIGS. 13a–13c show how the overlapping part of the pixel electrode 6 with the auxiliary capacitors electrode 3 decreases from the region A, corresponding to FIG. 13a, to region C, corresponding to FIG. 13c.

Figure 3:
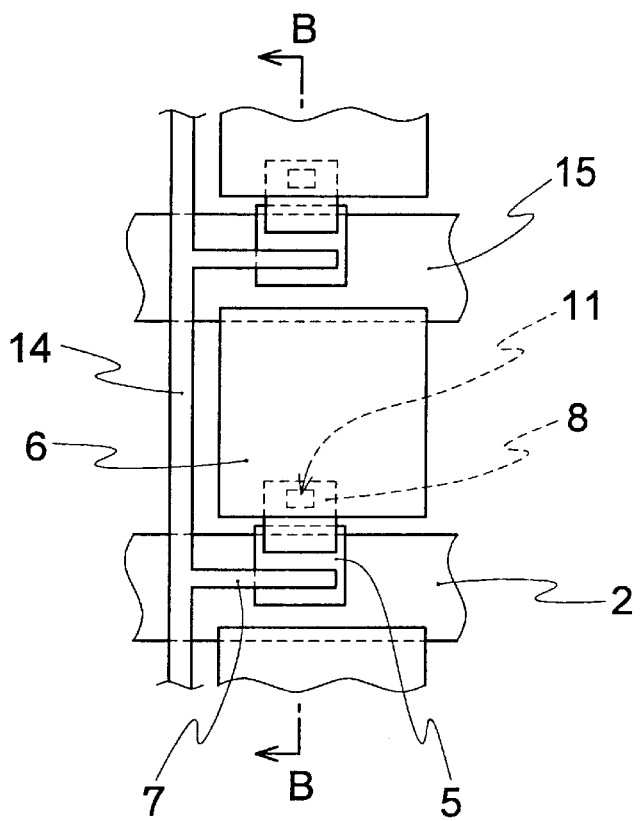
FIG. 3 is a plan view showing an example of displaying pixels of liquid crystal panel of another embodiment of the present invention.
Figure 4:
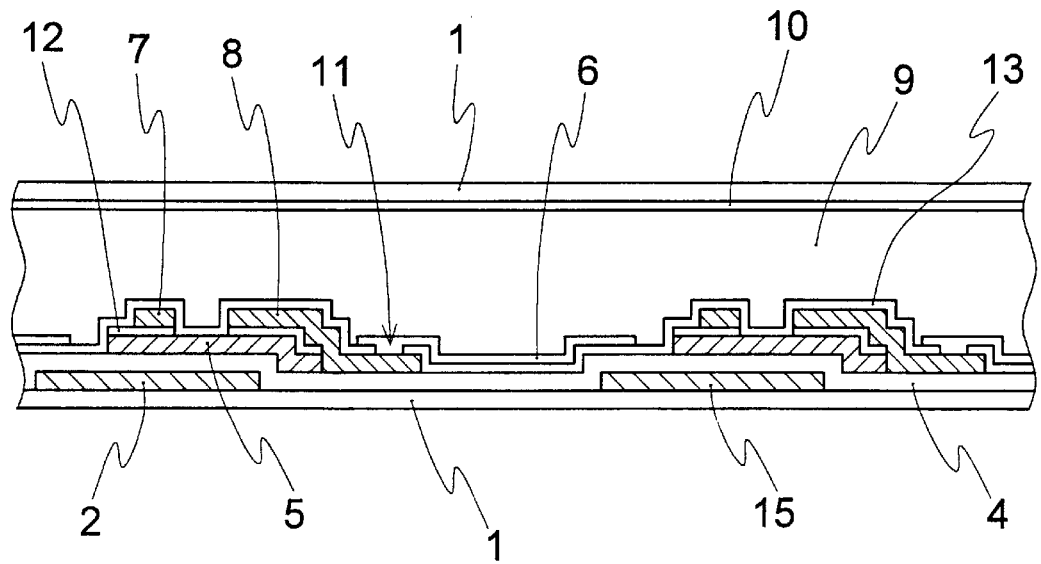
FIG. 4 is a cross sectional view showing an example of displaying pixels of another embodiment of liquid crystal panel of the present invention.

FIG. 3 is a plan view of a display pixel made of a different construction of a liquid crystal panel according to a preferred embodiment of the present invention, and FIG. 4 is a cross section view cut along the line B—B of FIG. 3.

First, a first metal thin film is formed on a glass substrate by sputtering or the like, and then a gate signal line, a gate electrode 2, and a pre-stage gate electrode 15 are formed in a desired pattern. Next, an insulating film 4, a semiconductor active film 5, and an ohmic contact film 12 are successively formed by plasma CVD, and the semiconductor active film 5 and the ohmic contact film 12 are formed in a desired pattern. Subsequently, a second metal thin film is formed by sputtering or the like and, after a source electrode 7, a drain electrode 8, and a source line 14 are formed in a desired pattern, a protective film 13 is formed, and a pixel electrode 6 is formed thereon. At this time, the pixel electrode 6 is connected to the drain electrode 8 via a contact hole 11. The pixel electrode 6 is allowed to partially overlap with the prestage gate electrode 15 to form an auxiliary capacitance. The overlapping amount is allowed to decrease as shown in FIG. 11 in the direction from the region A to the region C as shown in FIG. 10 (as it approaches from the gate signal input terminal to the end terminal).

Embodiment 1

Figure 5:
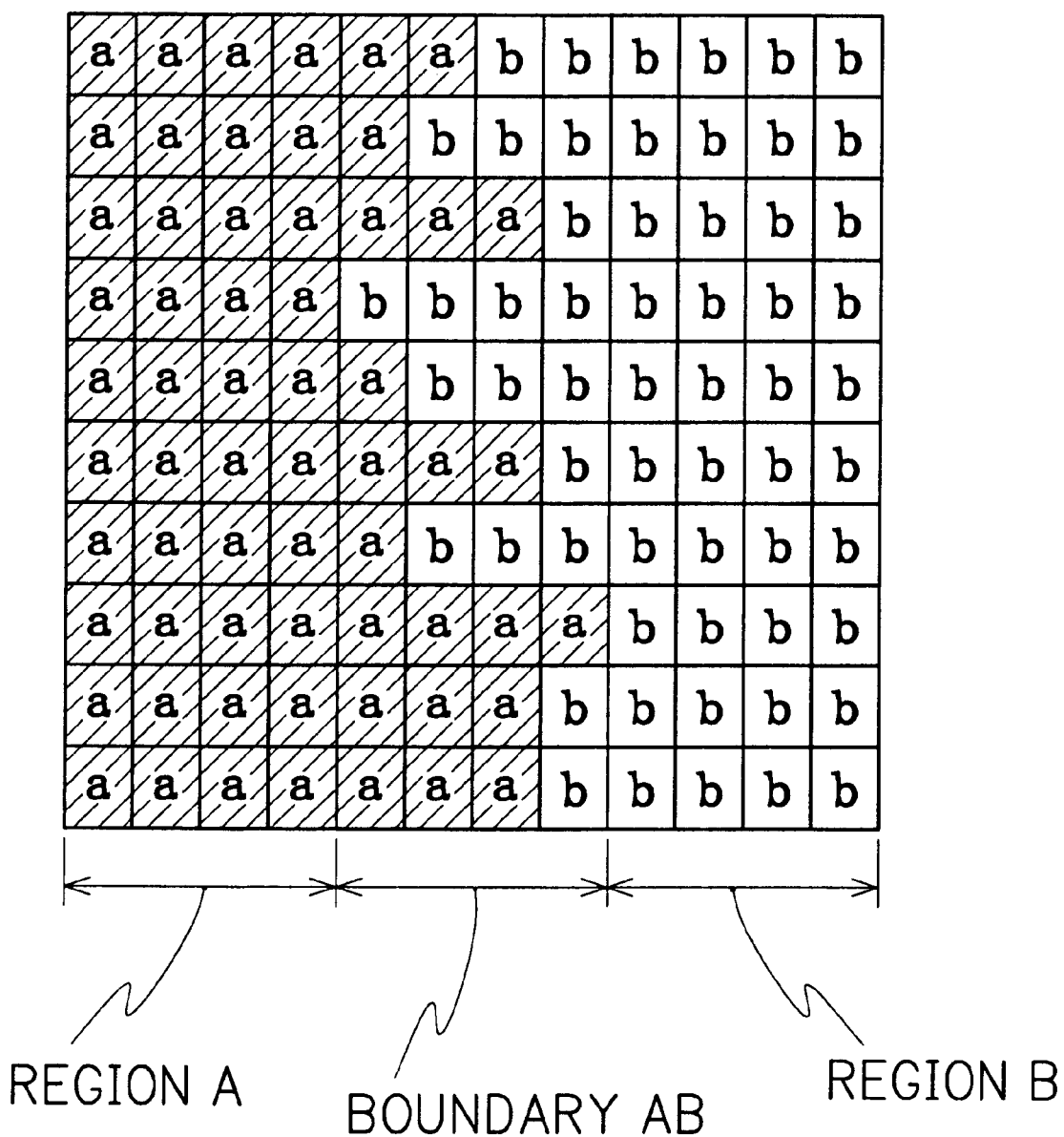
FIG. 5 is an explanatory view showing an example of liquid crystal display device of EMBODIMENT 1 of the present invention.

Hereafter, Embodiment 1 of the present invention will be described with reference to FIG. 5. FIG. 5 is an enlarged view of a boundary part AB of FIG. 10. Referring to FIG. 5, the boundary AB where pixels a and pixels b formed according to the aforesaid method of producing a liquid crystal panel and having different auxiliary capacitance values are adjacent to each other is formed in an uneven shape instead of a linear shape. As a result, the region A and the region B where pixels a and pixels b having different brightnesses due to the field-through voltage difference are respectively present contact with each other at a boundary having an irregular shape, so that the regularity and the continuity of the brightness difference generated along the boundary are reduced and are more unlikely to be recognized as a brightness non-uniformity by a human eye, whereby the brightness non-uniformity caused by the field-through voltage difference $\Delta V_{FD2}$ is reduced. Further, by providing a similar configuration at other boundary parts, the brightness non-uniformity caused by the $V_{FD2}$ can be reduced.

Embodiment 2

Figure 6:
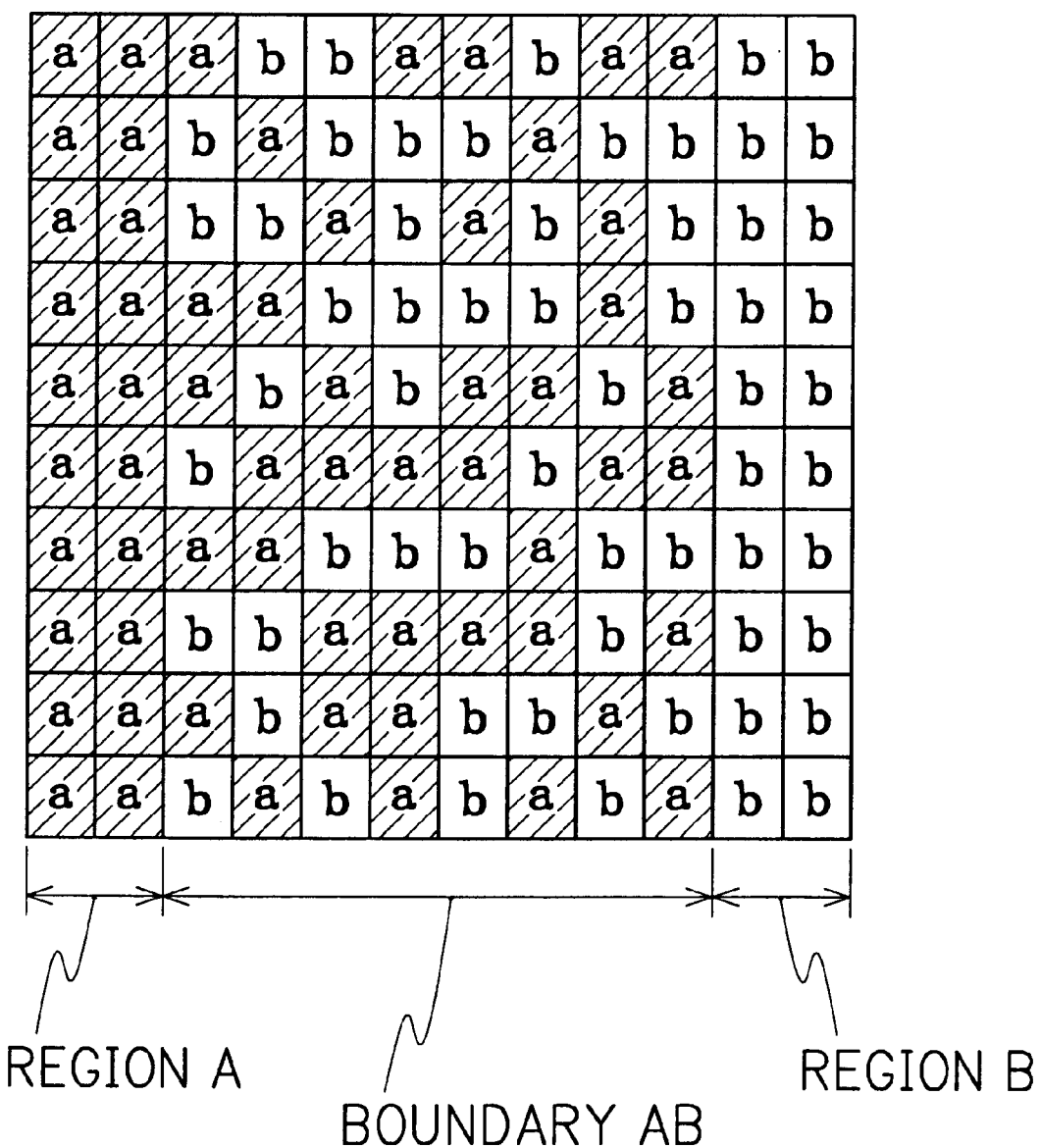
FIG. 6 is an explanatory view showing an example of EMBODIMENT 2 of liquid crystal display device of the present invention.
Figure 8:
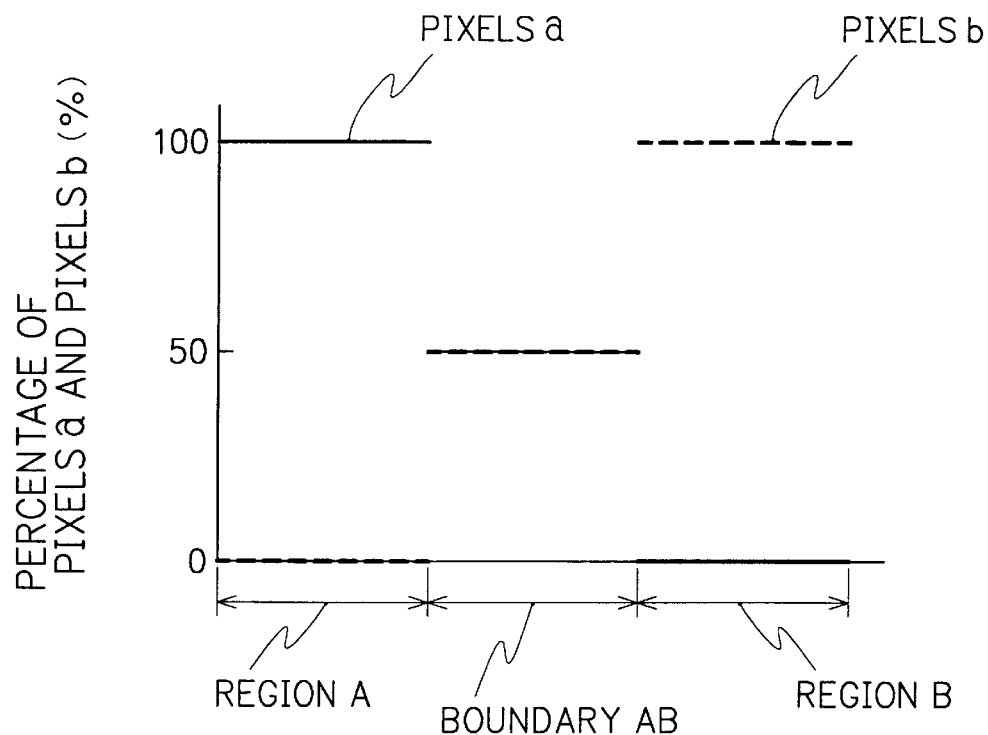
FIG. 8 is a graph showing a percentage of pixels having a different value of auxiliary capacitance in the boundary of FIG. 6.

Next, Embodiment 2 of the present invention will be described with reference to FIGS. 6 and 8. FIG. 6 is a view showing the configuration of the pixels at the boundary part constructed by the region A and the region B, and FIG. 8 is a view showing change in the ratio of the number of pixels a and pixels b per one source line at the boundary part.

Referring to FIG. 6, at the boundary AB where pixels a and pixels b formed according to the aforesaid method of producing a liquid crystal panel and having different auxiliary capacitance values are adjacent to each other, a region where the pixels a and the pixels b are mixedly present is formed, and the pixels a and the pixels b are randomly disposed in the boundary region. As a result, the regularity and the continuity of the brightness difference generated along the boundary are further reduced or eliminated and are not recognized as a brightness non-uniformity by a human eye, whereby the brightness non-uniformity caused by the field-through voltage difference $\Delta V_{FD2}$ is further reduced. Further, by providing a similar configuration at other boundary parts, the brightness non-uniformity caused by the $\Delta V_{FD2}$ can be reduced, although not described in detail here.

Embodiment 3

Figure 7:
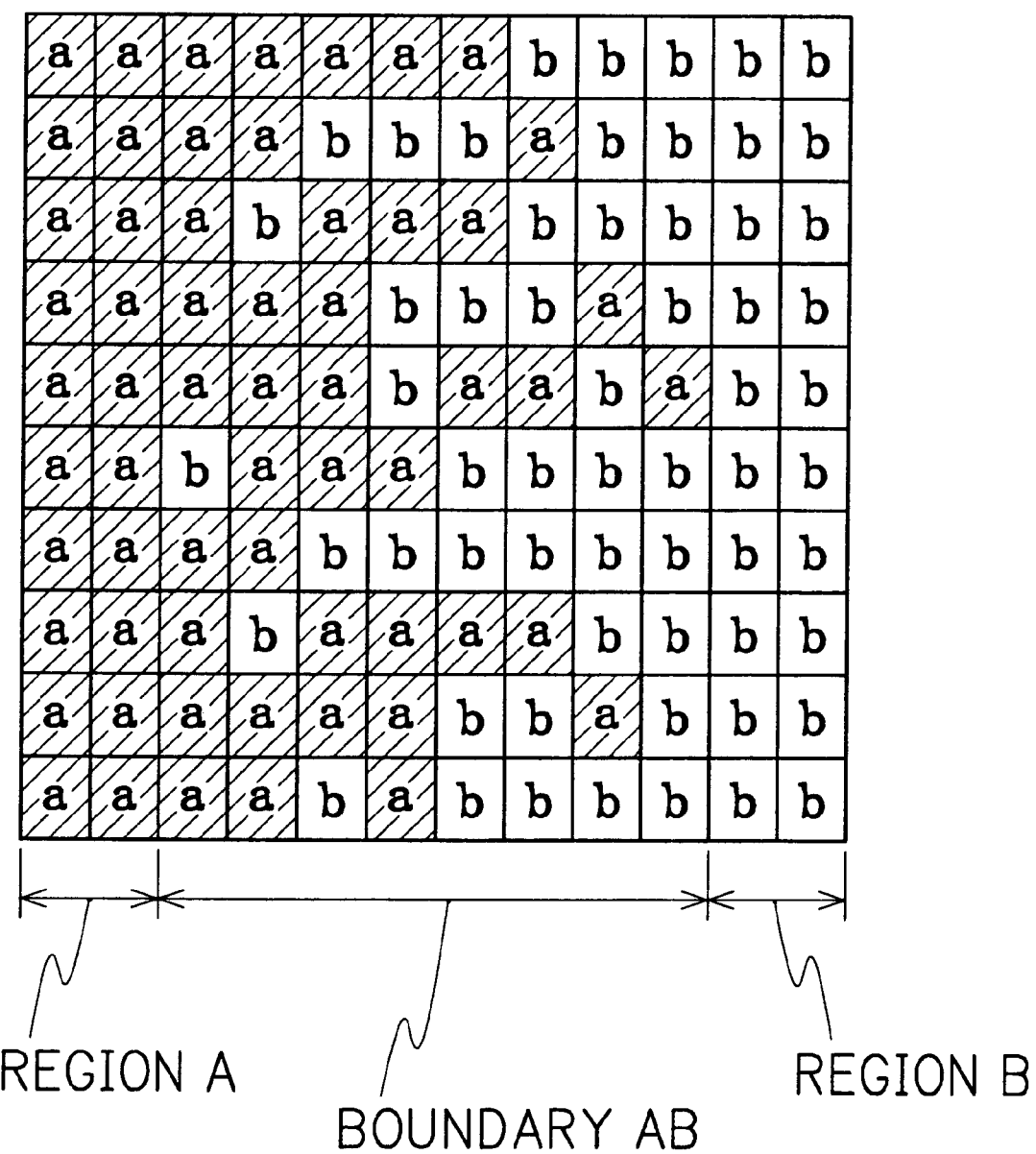
FIG. 7 is an explanatory view showing an example of EMBODIMENT 3 of liquid crystal display device of the present invention.

Next, Embodiment 3 of the present invention will be described with reference to FIGS. 7 and 9. FIG. 7 is a view showing the configuration of the pixels at the boundary part constructed by the region A and the region B, and FIG. 9 is a view showing change in the ratio of the number of pixels a and pixels b along the source address at the boundary part.

Figure 9:
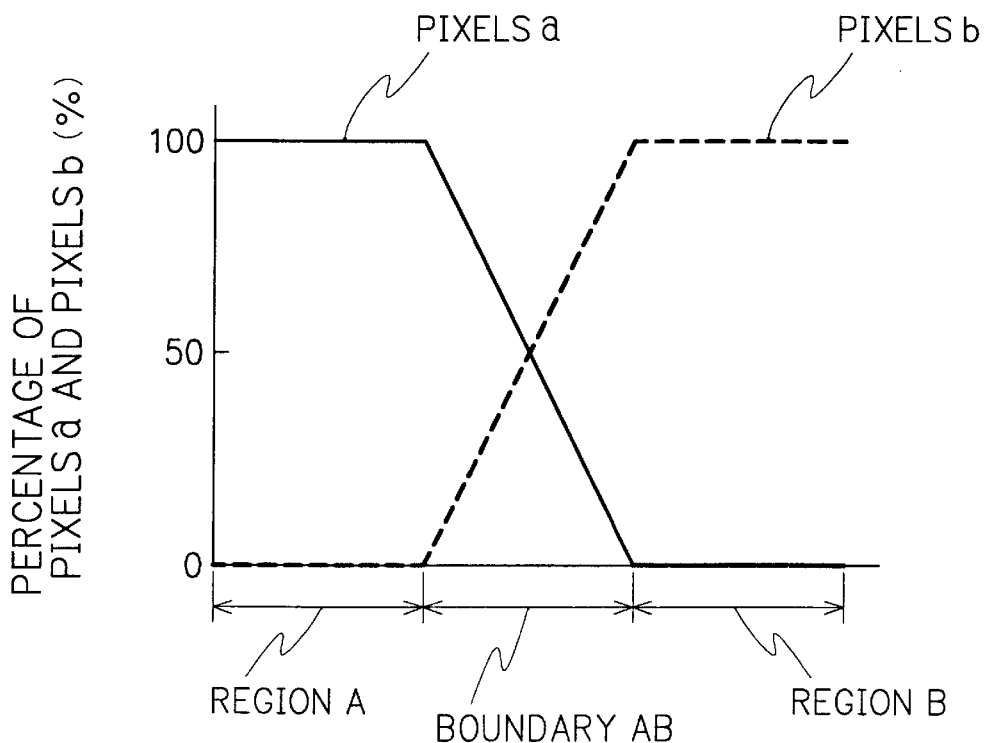
FIG. 9 is a graph showing a percentage of pixels having a different value of auxiliary capacitance in the boundary of FIG. 7.

Referring to FIG. 7, at the boundary AB where pixels a and pixels b formed according to the aforesaid method of producing a liquid crystal panel and having different auxiliary capacitance values are adjacent to each other, a region where the pixels a and the pixels b are mixedly present is formed, and the pixels a and the pixels b are disposed so that the ratio of the pixels a and the pixels b changes continuously along the source address, as shown in FIG. 9. As a result, the regularity and the continuity of the brightness difference generated along the boundary are further reduced or eliminated, and the change in brightness at the boundary becomes moderate and is not recognized as a brightness non-uniformity by a human eye, whereby the brightness non-uniformity caused by the field-through voltage difference $\Delta V_{FD2}$ is further reduced. Further, by providing a similar configuration at other boundary parts, the brightness non-uniformity caused by the $\Delta V_{FD2}$ can be reduced.

Furthermore, although the aforesaid preferred embodiments have been described as examples in which the auxiliary capacitance value is varied in order to reduce the field-through voltage difference, the same effect can be produced by changing other capacitance values such as a capacitance between the gate and the drain.

In the liquid crystal display device of the present invention, the brightness non-uniformity at the regional boundary can be reduced because the regional boundary is formed in an uneven shape or a region where the pixels on both sides of the boundary are mixedly present is formed at the regional boundary part in a liquid crystal display device in which the auxiliary capacitance value is varied for each region on the display screen in order to reduce the brightness non-uniformity or flickers caused by the difference in the field-through voltage between the right side and the left side of the screen.

The forgoing is considered as illustrative only of the principles of the invention. Further, because numerous modifications and changes will readily occur to those skilled in the art, it is not desired to limit the invention to the exact construction and operation shown and described, and accordingly all suitable modifications and equivalents may be restored to falling within the scope of the invention as defined by the claims which follows.

What is claimed is:

1. A liquid crystal display device comprising:

a thin film transistor (TFT) substrate having a plurality of displaying pixels each with a pixel electrode connected to respective TFT;

a plurality of gate lines for scanning said TFTs in linewise manner;

a plurality of source lines for applying signal potential of writing picture to the pixels, arranged almost perpendicular with said gate lines in a matrix manner;

an opposing substrate interposing a liquid crystal material together with the TFT array substrate therebetween; and a plurality of auxiliary capacitance electrode;

wherein each of said pixel electrodes forms an auxiliary capacitance by overlapping with respective auxiliary capacitance electrode, said overlapping is decreased in a direction from a signal input side to a signal transmission end of each gate line to form a difference of auxiliary capacitance value depending on a plurality of vertical band regions, and boundaries of said vertical band regions are formed in a zigzag manner.

2. A liquid crystal display device comprising:

a thin film transistor (TFT) substrate having a plurality of displaying pixels each with a pixel electrode connected to respective TFT;

a plurality of gate lines for scanning said TFTs in linewise manner;

a plurality of source lines for applying signal potential of writing picture to the pixels, arranged almost perpendicular with said gate lines in a matrix manner; and an opposing substrate interposing a liquid crystal material together with the TFT array substrate therebetween;

wherein each of said pixel electrodes forms an auxiliary capacitance by overlapping with respective gate electrode, said overlapping is decreased in a direction from a signal input side to a signal transmission end of each gate line to form a difference of auxiliary capacitance value depending on a plurality of vertical band regions, and boundaries of said vertical band regions are formed in a zigzag manner.

3. A liquid crystal display device comprising:

a thin film transistor (TFT) substrate having a plurality of displaying pixels each with a pixel electrode connected to respective TFT;

a plurality of gate lines for scanning said TFTs in linewise manner;

a plurality of source lines for applying signal potential of writing picture to the pixels, arranged almost perpendicular with said gate lines in a matrix manner;

an opposing substrate interposing a liquid crystal material together with the TFT array substrate therebetween; and a plurality of auxiliary capacitance electrode;

wherein each of said pixel electrodes forms an auxiliary capacitance by overlapping with respective auxiliary capacitance electrode, said overlapping is decreased in a direction from a signal input side to a signal transmission end of each gate line to form a difference of auxiliary capacitance value depending on a plurality of vertical band regions, and boundary regions of said vertical band regions are formed in such a manner where the pixels having different value of the auxiliary capacitance are randomly arranged.

4. A liquid crystal display device comprising:

a thin film transistor (TFT) substrate having a plurality of displaying pixels each with a pixel electrode connected to respective TFT;

a plurality of gate lines for scanning said TFTs in linewise manner;

a plurality of source lines for applying signal potential of writing picture to the pixels, arranged almost perpendicular with said gate lines in a matrix manner;

an opposing substrate interposing a liquid crystal material together with the TFT array substrate therebetween; and a plurality of auxiliary capacitance electrode;

wherein each of said pixel electrodes forms an auxiliary capacitance by overlapping with respective auxiliary capacitance electrode, said overlapping is decreased in a direction from a signal input side to a signal transmission end of each gate line to form a difference of auxiliary capacitance value depending on a plurality of vertical band regions, and boundary regions of said vertical band regions are formed in such a manner where the pixels having different value of the auxiliary capacitance are arranged gradually along with a source address in the boundary regions.

5. A liquid crystal display device comprising:

a thin film transistor (TFT) substrate having a plurality of displaying pixels each with a pixel electrode connected to respective TFT;

a plurality of gate lines for scanning said TFTs in linewise manner;

a plurality of source lines for applying signal potential of writing picture to the pixels, arranged almost perpendicular with said gate lines in a matrix manner;

an opposing substrate interposing a liquid crystal material together with the TFT array substrate therebetween; and a plurality of auxiliary capacitance electrode;

wherein each of said pixel electrodes forms an auxiliary capacitance by overlapping with respective gate line, said overlapping is decreased in a direction from a signal input side to a signal transmission end of each gate line to form a difference of auxiliary capacitance value depending on a plurality of vertical band regions, and boundary regions of said vertical band regions are formed in such a manner where the pixels having different value of the auxiliary capacitance are randomly arranged.

6. A liquid crystal display device comprising:

a thin film transistor (TFT) substrate having a plurality of displaying pixels each with a pixel electrode connected to respective TFT;

a plurality of gate lines for scanning said TFTs in linewise manner;

a plurality of source lines for applying signal potential of writing picture to the pixels, arranged almost perpendicular with said gate lines in a matrix manner;

an opposing substrate interposing a liquid crystal material together with the TFT array substrate therebetween; and a plurality of auxiliary capacitance electrode;

wherein each of said pixel electrodes forms an auxiliary capacitance by overlapping with respective gate line, said overlapping is decreased in a direction from a signal input side to a signal transmission end of each gate line to form a difference of auxiliary capacitance value depending on a plurality of vertical band regions, and boundary regions of said vertical band regions are formed in such a manner where the pixels having different value of the auxiliary capacitance are arranged gradually along with a source address in the boundary regions.

* * * * *